(12) United States Patent
Bar-Levav

(10) Patent No.: US 6,237,872 B1
(45) Date of Patent: *May 29, 2001

(54) AIRCRAFT CABIN ENVIRONMENT

(76) Inventor: Reuven Bar-Levav, 300 Town Center, Suite 1250, Southfield, MI (US) 48075

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/801,799

(22) Filed: Feb. 14, 1997

(51) Int. Cl.[7] ................................................. B64D 11/06
(52) U.S. Cl. .................................. 244/118.6; 244/118.5; 105/314; 105/340
(58) Field of Search .................. 244/118.5, 118.6; 105/344, 345, 340, 314, 315, 316, 323, 326; 296/64

(56) References Cited

U.S. PATENT DOCUMENTS

| | | | |
|---|---|---|---|
| 1,568,855 | * | 1/1926 | Lawson . |
| 1,838,765 | * | 12/1931 | Hutt . |
| 2,364,595 | * | 12/1944 | Tully et al. . |
| 2,608,366 | * | 8/1952 | Jergenson . |
| 2,813,494 | * | 11/1957 | Haman et al. . |
| 2,914,001 | | 11/1959 | Murphy ............................... 105/315 |
| 2,977,898 | * | 4/1961 | Candlin . |
| 4,799,631 | * | 1/1989 | Humphries et al. . |
| 4,854,245 | * | 8/1989 | Platzer . |
| 4,881,702 | * | 11/1989 | Slettebak .......................... 244/118.6 |
| 4,964,671 | * | 10/1990 | Millar . |
| 5,716,026 | | 2/1998 | Pascasio et al. ................... 244/118.6 |
| 5,829,836 | | 11/1998 | Schumacher et al. ............... 297/257 |
| 5,860,701 | | 1/1999 | Jungjohann et al. ................ 297/316 |

FOREIGN PATENT DOCUMENTS 811 841 * 8/1951 (DE) ...................................... 296/64

* cited by examiner

Primary Examiner—Charles T. Jordan
Assistant Examiner—Tien Dinh
(74) Attorney, Agent, or Firm—Gifford, Krass, Groh, Sprinkle, Anderson & Citkowski, P.C.

(57) ABSTRACT

This invention relates to passenger accommodations for aircraft including an improved passenger seat, three improved seating plans, improved food service, and an electronic dining and restroom facility reservation system.

28 Claims, 12 Drawing Sheets

AIRCRAFT CABIN ENVIRONMENT

TECHNICAL FIELD

This invention relates to passenger accommodations for aircraft including an improved passenger seat, improved seating arrangements, improved food service, and a dining and restroom facility reservation system.

BACKGROUND ART

Conventional cabin designs for wide-body aircraft do not maximize passenger comfort and are detrimental to the short term health of travelers. With the introduction and availability of relatively inexpensive integrated circuit chip technology and other innovations, it is now possible to design the cabin of wide-body aircraft such that passengers may assume an almost complete horizontal position during transcontinental and long intercontinental flights. In a horizontal position, the weight of a passenger's body is more evenly distributed thereby preventing back pain, swelling of the ankles and feet, and other forms of physical discomfort.

Shortcomings in conventional cabin designs have been recognized since the beginning of commercial aviation, and many ideas have been advanced to improve passenger accommodations. Unfortunately, many of these designs were deemed to be impractical.

Of some interest is U.S. Pat. No. 2,081,529 granted on May 25, 1937 to F. R. Canney. It was meant to provide sleeping berths in smaller and slower planes. Seats had to be converted into sleeping berths and, in addition, the seats faced both forward and rearward, a configuration now forbidden by Federal regulations.

Also of interest is U.S. Pat. No. 2,092,655 granted on Sep. 7, 1937 to G. A. Page, Jr. Its arrangement for sleeping on aircraft was similar to first-class sleeping arrangements on railroad cars. It was never implemented probably because the convertible cabins were not efficient enough even for the very limited needs of air transportation in those days.

Also relevant is U.S. Pat. No. 2,124,003 granted on Jul. 19, 1938 to J. S. McDonnell, Jr. et al. The invention was meant to provide privacy in closed cabin-like arrangements, but since two seating rows were required for every sleeping row, only half the number of seats could have been used. Similar to Pullman sleepers used on railway coaches, this invention was also meant for relatively small planes and would not meet the needs of mass transportation. Any successful solution for greater passenger comfort on aircraft must be efficient enough to satisfy the many air travellers who normally fly only when air fares are relatively low.

U.S. Pat. No. 2,208,683 granted on Jul. 23, 1940 to G. A. Page, Jr. also recommended converting aircraft seats into sleeping berths, and then back again. This invention was labor-intensive and made inefficient use of cabin space. As a result, this invention would increase air fares considerably. Similarly, U.S. Pat. No. 2,280,065 granted on Apr. 21, 1942 to T. De Roode, also requires converting seats into sleeping berths.

U.S. Pat. No. 2,332,841 granted to E. F. Burton et al. on Oct. 26, 1943, an improvement of an earlier patent, is concerned with improving the construction of chairs, again by converting two chairs into a single berth.

T. De Roode was granted U.S. Pat. No. 2,382,402 on Aug. 14, 1945 and again it required conversion of seats to sleeping berths.

U.S. Pat. No. 2,608,366 granted to G. A. Jergenson on Aug. 26, 1952 shows passenger seats facing both forwards and backwards on two sitting levels. Additionally, in the past more space was often allocated to each passenger than today.

U.S. Pat. No. 3,784,989 granted to Legrand on Jan. 15, 1974 was intended to increase passenger comfort by constructing "relax units" in an interlocking structure of individual berths. However, in such an arrangement normal blood flow at pressure points is interfered with, since in the resting position it offers only minimal freedom to move. The proposed solution would give rise to much physical discomfort or even to pain after only a brief period of time.

U.S. Pat. No. 4,066,227 granted to Buchsel on Jan. 3, 1978 discloses a dual deck seating arrangement. The fixed upper seating deck includes an aisle and is reached by passengers via a stairway.

U.S. Pat. No. 4,589,612 granted to Halim on May 20, 1986 required the conversion of seating configurations into bedding configurations and vice versa. Further, this invention required that adjacent passengers agree as to when and for how long seats would remain in a bedding configuration. Additionally, sitting in a 90 degree angle posture, as required in the seating configuration, is known to quickly cause a great deal of physical discomfort and even extreme pain in lower back muscle groups. Even young and healthy people find this position extremely uncomfortable after relatively short periods of time, and it is totally intolerable by most older people, by those who are even mildly overweight and by anyone with a chronic illness or impairment involving the heart and lungs. Finally, this invention required that passengers lie in an unsafe position, wherein a passenger's head pointed toward either the front or the rear of the aircraft.

U.S. Pat. No. 4,686,908 issued on Aug. 18, 1987 to Legrand again has lower level seats and upper level lounger chairs with alternating forward and rearward orientations. Again, the position of a passenger's head is in the unsafe direction towards the front or the rear of the aircraft.

The search to increase the comfort of aircraft passengers has been long and some patents have even required changes in the body design of the aircraft, such as U.S. Pat. No. 5,115,999 granted to Buchsel et al. on May 26, 1992. Some inventions were very costly in terms of space utilization, and others would have imposed severe limitations on the freedom of passengers to move about within the aircraft, entailing much physical discomfort. Many inventions have required a great deal of labor for repeated assembly and disassembly of berths.

Finally, U.S. Pat. No. 5,425,516 granted to Daines on Jun. 20, 1995 has only two seating levels and requires that some seats be lowered to obtain a fully reclined position. In addition, this invention requires a large amount of space between seat rows.

SUMMARY OF THE INVENTION

An object of this invention is to provide greater physical and emotional comfort to passengers during long intercontinental and transcontinental flights without reducing the number of seats in the aircraft, thus maintaining a reasonable price structure. Repeated opinion surveys confirm that almost universally the single most important feature desired by passengers during long flights is the ability to stretch out for resting or sleeping. The present invention achieves this feature through three innovative seating arrangements or plans.

Another object of the present invention is to provide an improved passenger chair and an innovative two-way, interactive communication system between each passenger and the flight crew.

Another object of the present invention is to improve the health, safety and well-being of passengers by introducing a series of additional innovations in the food and beverage service by offering a dining and restroom facility reservation system, and by offering passengers other previously unavailable amenities that lessen the stress of air travel.

Another object of the present invention is an improved passenger seat. The seat includes special legrests, grab bars and a mechanism which gently raises and lowers the back of the seat and which provides an increased degree of rearward tilt to enable passengers to assume practically a horizontal position. Passengers are bound to have to leave their seat from time to time for whatever reason, and this modified passenger chair makes it possible with only minimal disturbance to oneself and to others. The grab bars at the headrest level on both sides of each seat enable passengers who occupy seats away from the aisle to support themselves, if needed, when they step over the legrests of fully reclined chairs. These legrests are sufficiently narrower in width than the seat itself, so that enough space exists between any two seats to allow passengers to step over a reclined seat and onto the floor comfortably.

A first seating plan has a two tier seating configuration along the midsection of wide-body aircraft, with an upper deck being added. The pitch, the space between adjacent rows of seats, is markedly increased. Seats lost as a result of the increased pitch are gained back by the additional seats on the upper level.

A second and third seating plan follow different concepts to achieve the same goal of increased passenger comfort, but they too enable passengers to stretch out almost completely during long flights, lessening fatigue, discomfort and jet-lag. The service, meals and amenities of First Class would still remain superior, but ComfortAir Class provides almost equal space for physical rest of the body.

The second seating plan leaves the pitch between consecutive rows unchanged from conventional designs. The increased comfort of passengers is achieved by staggering the floor height of consecutive rows of seats along the entire midsection of the aircraft so that only every fifth row is at the same level.

In the third seating plan, the midsection seating configuration provides a combination of fully matted, individualized, open-ended shelf-like sleeping compartments together with the more spacious seating arrangement of the first seating plan on top of these compartments.

Coincidental with the redesign of the cabin seating configuration, this invention also completely revises the current food and beverage service for any type transportation vehicle, such as an aircraft and railroad passenger trains, and offers a dining and restroom facility reservation system.

The above objects and other objects, features, and advantages of the present invention will be readily apparent from the following detailed description of the best mode for carrying out the invention when taken in conjunction with the accompanying drawings.

BEST MODE FOR CARRYING OUT THE PRESENT INVENTION

Figure 1:
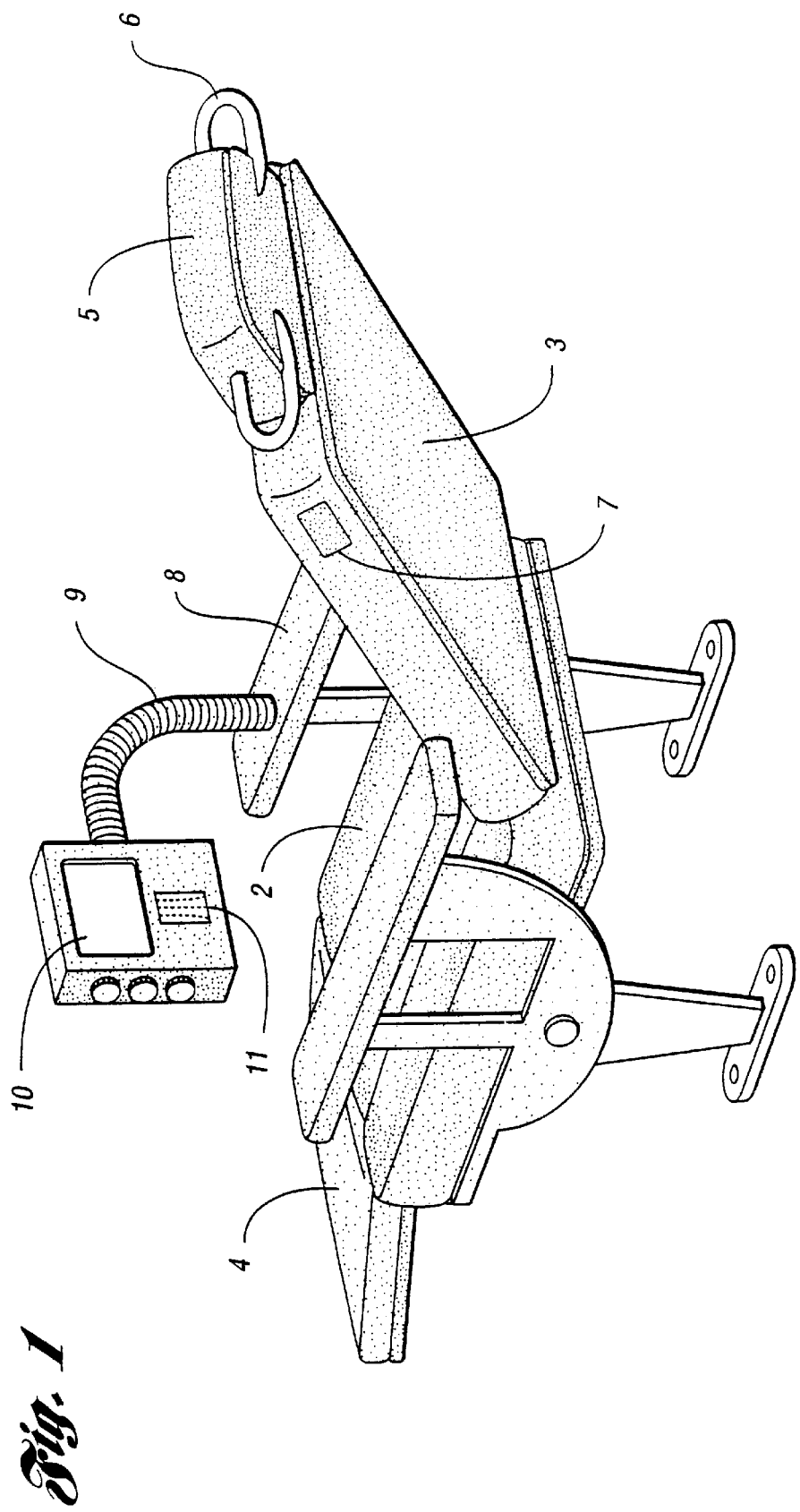
FIG. 1 is a perspective view of a passenger chair showing grab bars and a monitor including a push button control panel.

The present invention will now be described in detail with reference to the accompanying drawings. Although the descriptions that follow give exact measurements, such measurements apply only for the preferred arrangements of each of three seating plans. This patent also covers same-principle arrangements that vary in measurements of pitch, seating configurations, luggage enclosures, the degree of tilt of the back of seats, the size of legrests, and all other details. For instance, the pitch, the space between adjacent rows of seats, may be modified by plus or minus four inches with the desired result of much greater passenger comfort without a loss in the number seats still being achievable.

Only the preferred embodiment of these plans is given in the drawings. These ought to be considered in all respects as illustrative and not as restrictive, and this invention is not limited by any one or all of the described details, which are all modifiable as needed. The basic innovations of this invention are best understood by studying the claims Made section found at the end of this document.

This invention consists of an improved reclining passenger chair including a two-way communications monitor and a twelve push button control panel, a first seating plan, a second seating plan, and a third seating plan, a "Dining—Just Below the Angels" parlor, a food dispensing self-service restaurant, a dining and restroom facility reservation system plus a variety of innovative additional amenities all based on and using the new interactive communication system. The aircraft included in these seating configuration drawings are Boeing 747, Boeing 777 and Airbus A330, but this list is not to be considered as exhaustive since these configurations can easily also be modified for different types and models of aircraft.

FIG. 1 shows the improved ComfortAir passenger chair or seat 1. The ComfortAir chair 1 includes an increased amplitude of tilt of the seat back 3, legrests 4 that may be raised almost to the level of a seat bottom 2, a headrest 5 having a grab bar 6 on each side, and a prominent push button 7 on each side which temporarily raises and then lowers the seat back 3. Conventional motors and servomechanisms can be employed to perform this seat movement. In addition, attached to an armrest 8 of each chair 1 is a monitor 10 with a push button control panel 11 having twelve buttons to activate a two-way interactive communications system. Conventional monitors and communications systems can be employed to perform this function.

Passengers are bound to have to leave their seat from time to time for whatever reason, and this improved passenger chair makes it possible with only minimal disturbance to oneself and to others. The grab bars 6 at the headrest level 5 on both sides of seat 1 enable passengers who occupy seats away from the aisle to support themselves, if needed, when they step over the legrests 4 of a fully reclined chair 1. These legrests 4 are sufficiently narrower in width than the seat 1, so that enough space exists between any two seats to allow passengers to step over a reclined seat and onto the floor comfortably. When the red button 7 found on either side of chair 1 is pushed, the chairback 3 of a fully reclined seat slowly and gently rises by several inches, and the legrests 4 are lowered by several inches, making passage easier without having to trouble the person occupying the seat 1. Chairs automatically return to their original position after 30 seconds, or after any other pre-adjusted length of time.

Figure 2:
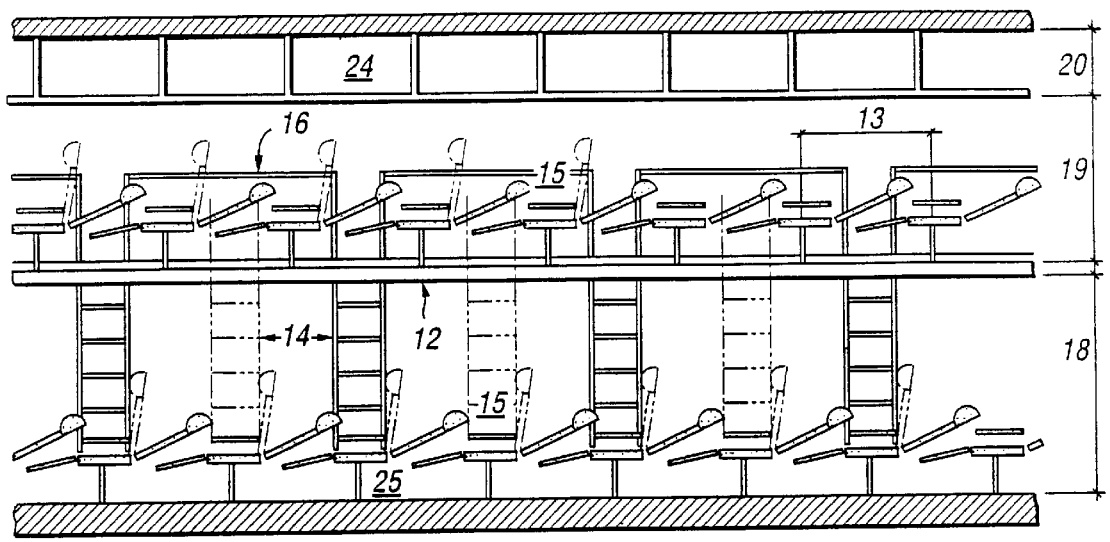
FIG. 2 is a longitudinal section view of a Boeing 747 showing a first seating plan including a two level seating configuration, improved passenger chairs, and stepladder-like devices for reaching an upper level.

A first seating plan is shown in FIGS. 2 through 10. FIG. 2 features an upper level 12 of seating all along the midsection, allowing for an increased 3'8" pitch 13 for all chairs 1 in ComfortAir Class without losing seating capacity.

FIG. 2 is a longitudinal section through the different types of aircraft listed above. Access to an upper level 12 is achieved by alternating step ladder-like devices 14 from the aisles on either side. Step ladder-like devices 14 are positioned so as not to block an entrance to any row of chairs 1 on the upper level 12 or the lower level. The rows in the upper level 12 have been shifted 15 to make this possible. The 3'8" pitch 13 has been increased from a 2'9" pitch 30 which currently exists in Economy class. Railings 16 have been added for passenger safety and to provide a sense of security without actually enclosing the space. Under-the-seat luggage storage 25 is similar in design but larger than present Economy class storage. For example, in the Boeing 747 the lower level headroom 18 is 6'6", the upper level 12 headroom 19 is 5'10", and overhead luggage enclosures 24 have a height 20 of 2'0".

As in the case of exit row seats now, upper level seating will be available only to those who identify themselves as having no physical disabilities that might prevent them from using such seating without hardship. Reaching the upper level requires taking four small steps up with the aid of comfortable handrails on both sides. The need for a space-costly center aisle on the upper level has been nullified by the passenger chair modifications, a critical improvement that makes these plans economically feasible.

Figure 3:
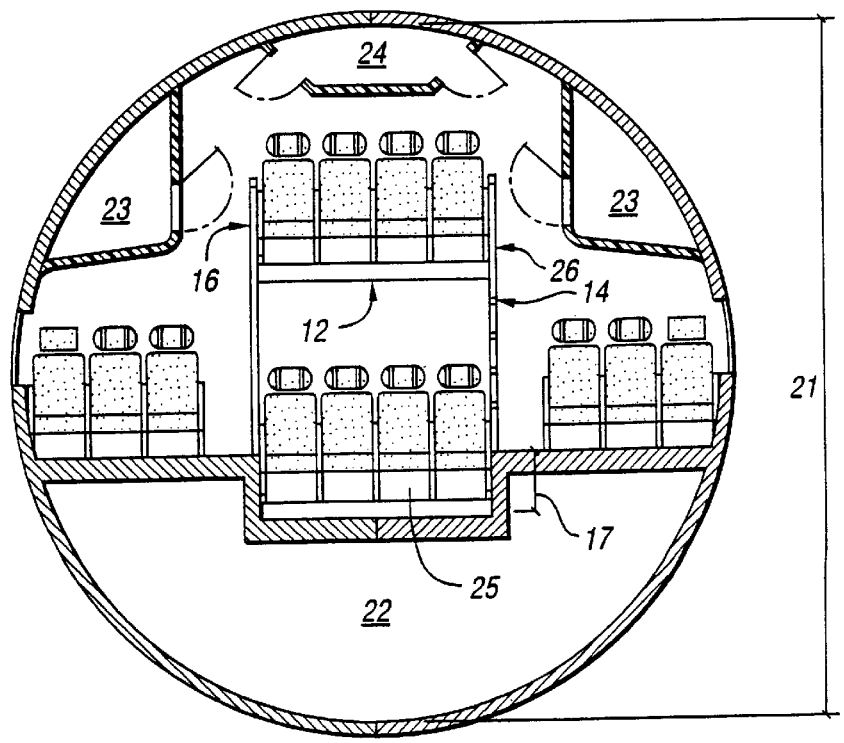
FIG. 3 is a cross-section view of a Boeing 747 showing a lowered floor in the midsection of the aircraft, enlarged side luggage enclosures and hand luggage enclosures above the upper level.

FIG. 3 shows the details of the first seating plan through a cross-sectional view of a Boeing 747 with an inside diameter 21 of 20'0". The two levels of the midsection show four adjacent chairs 1 per level, with a 1'5" dip 17 into a cargo hold 22 which provides a little more headroom 18, 19 (FIG. 2) on both levels. A 4" curb 26 keeps passenger gear from falling into the aisle below. The alternating stepladder-like devices 14 are indicated by solid and broken lines in FIG. 2, and are connected with side railings 16. The increased size of side luggage enclosures 23 and overhead hand luggage enclosure 24 together with presently existing under-the-seat luggage storage 25, provide more than enough space under normal circumstances.

Figure 4:
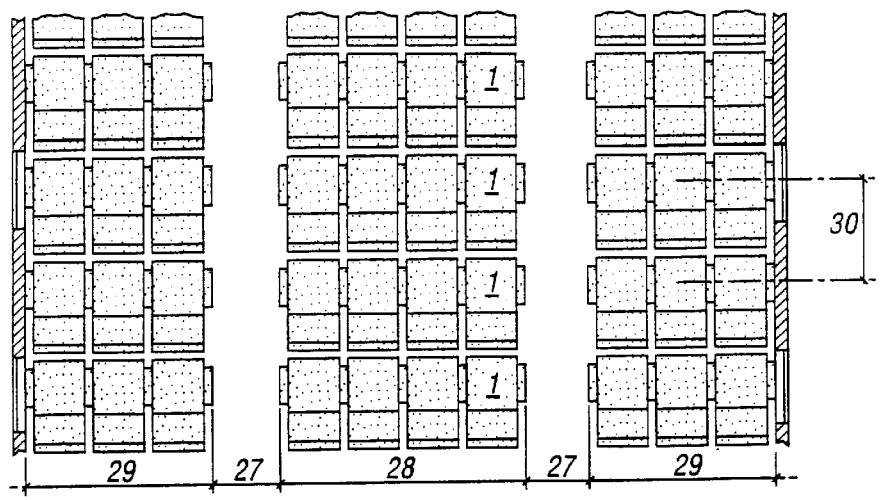
FIG. 4 is a partial floor plan of a Boeing 747 with an existing Economy class seating configuration.

FIG. 4 is an 11'0" segment of a partial floor plan of a Boeing 747 with the existing Economy class seating configuration having the customary 2'9" pitch 30. Aisle 27 width is 1'7", midsection 28 width is 6'10", and side section 29 width is 5'0" each.

Figure 5:
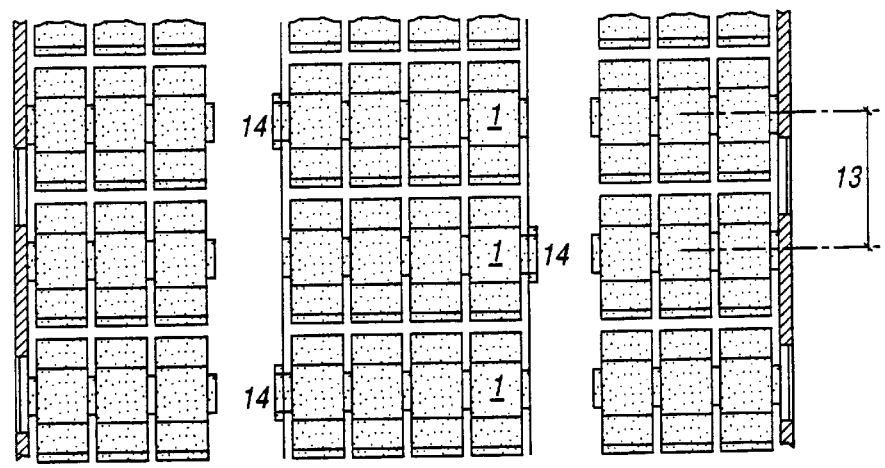
FIG. 5 is a lower level partial floor plan of a Boeing 747 with the proposed ComfortAir Class seating configuration of the first seating plan.
Figure 6:
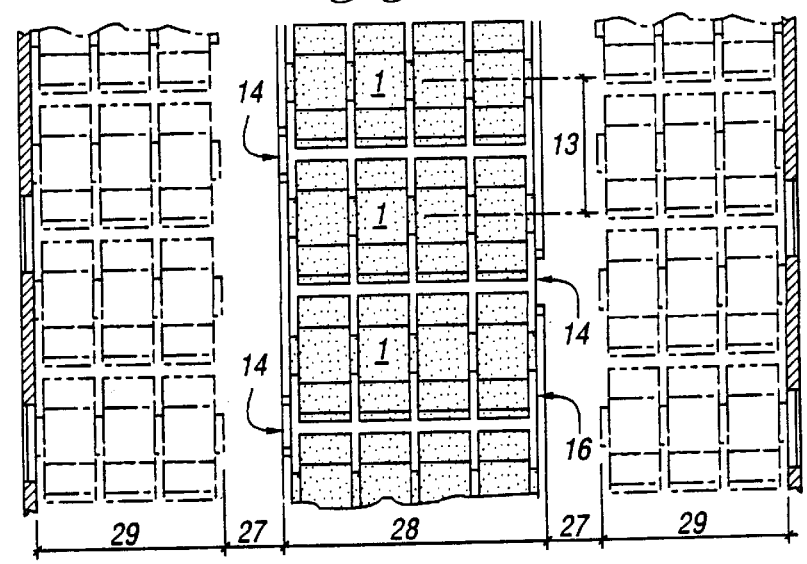
FIG. 6 is an upper level partial floor plan of a Boeing 747 with the proposed ComfortAir Class seating configuration of the first seating plan.

FIG. 5 is an 11'0" lower level partial floor plan of a Boeing 747 with the proposed ComfortAir Class seating configuration of the first seating plan having a 3'8" pitch 13, and FIG. 6 is an 11'0" upper level 12 partial floor plan of a Boeing 747 with the proposed ComfortAir Class seating configuration of the first seating plan, also indicating the position of the side section seats below in broken lines.

Using the Boeing 747 as an example, the current space between consecutive rows of seats is 2'9". The first seating plan changes this to 3'8" thus enabling each passenger to stretch out almost completely during flights, lessening fatigue, discomfort and jet lag. As FIGS. 4, 5 and 6 show, a partial midsection floor space area occupied at present by four rows with a total of 40 seats will thus accommodate three rows on two levels for a total of 42 seats, each affording much more spacious accommodations.

Because of dimensional differences between the various aircraft, the final number of seats obtained in each by introducing the first seating plan is slightly different from plane to plane, but the comfort of passengers is similarly increased in all cases. FIGS. 7, 8, 9 and 10 are partial floor plans and cross-sectional views which show the results of applying the seating configurations of the first seating plan in a Boeing 777 and in an Airbus A330.

Figure 7:
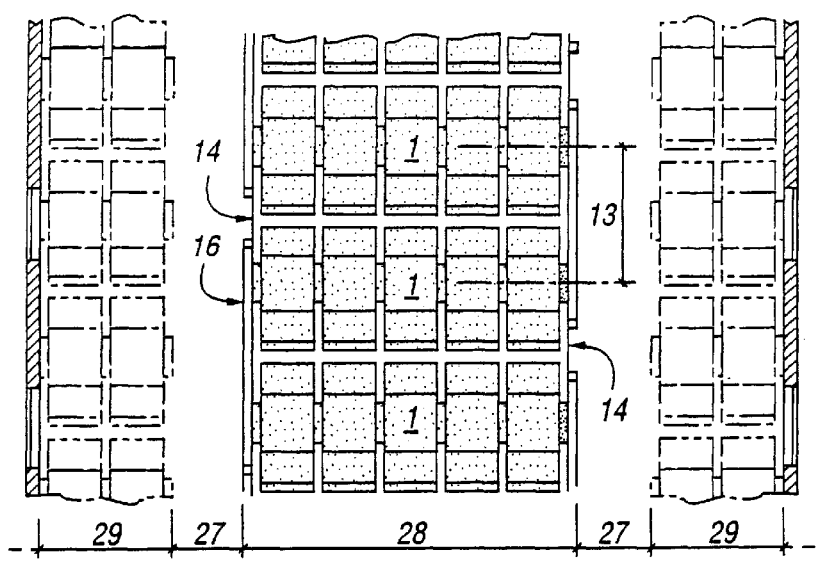
FIG. 7 is an upper level partial floor plan of a Boeing 777 with the proposed ComfortAir Class seating configuration of the first seating plan.

FIG. 7 is an 11'0" upper level 12 partial floor plan of a Boeing 777 with the proposed ComfortAir Class seating, having a 3'8" pitch 13. The combined lower and upper level 12 seating capacity under the first seating plan is 42 chairs 1, each row consisting of ten chairs 1 on two levels in the middle section, and four chairs 1 in the two side sections. The alternating ladders 14 and the side railings 16 are shown. The aisle 27 width is 1'7", the midsection 28 width is 8'8", and the side section 29 width is 3'7" each.

Figure 8:
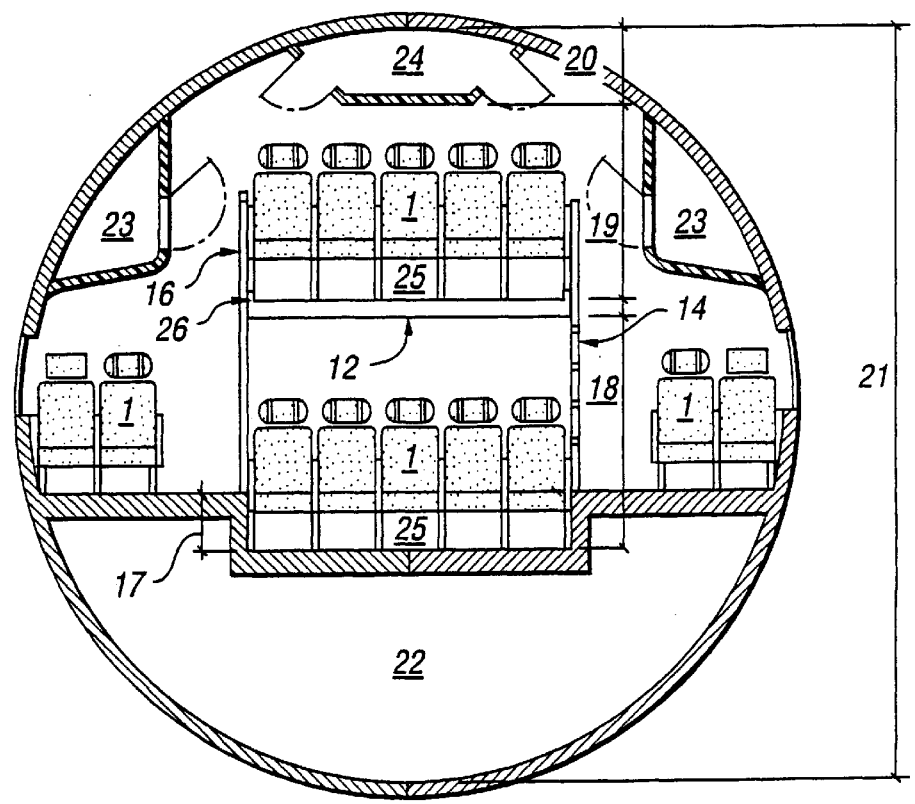
FIG. 8 is a cross-sectional view of a Boeing 777 with the proposed ComfortAir Class configuration of the first seating plan, showing enlarged side luggage enclosures, upper level luggage enclosure, and a dip into the cargo hold.

FIG. 8 shows the details of the first seating plan through a cross-sectional view of a Boeing 777 with an inside diameter 21 of 19'0". An upper level 12 of five adjacent chairs 1 is just above the lower level seats having the same arrangement. With the 1'5" dip 17 into the cargo hold 22, enough headroom 18, 19 is available for both levels. A 4" curb 26 keeps passenger gear from falling into the aisle below. The alternating stepladder-like devices 14 and the side railings 16 enclose the midsection seats. The increased size of the side luggage enclosures 23, together with the upper level luggage enclosure 24 and the presently existing under-the-seat luggage storage 25 provide sufficient space to satisfy the need for storage. The lower level headroom 18 is 6'0", the upper level 12 headroom 19 is 5'0" and the overhead luggage enclosure 24 has a height 20 of 2'0".

Figure 9:
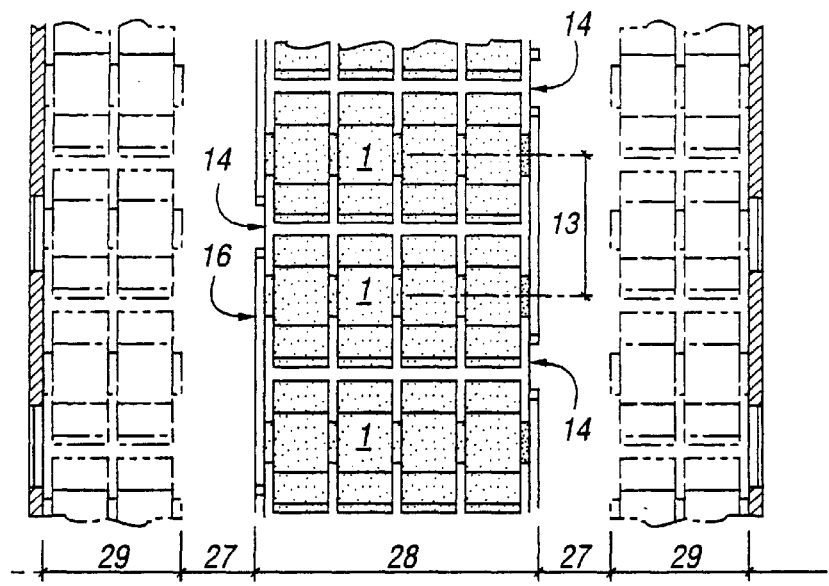
FIG. 9 is an upper level partial floor plan of an Airbus A330 with the proposed ComfortAir Class seating configuration of the first seating plan.
Figure 10:
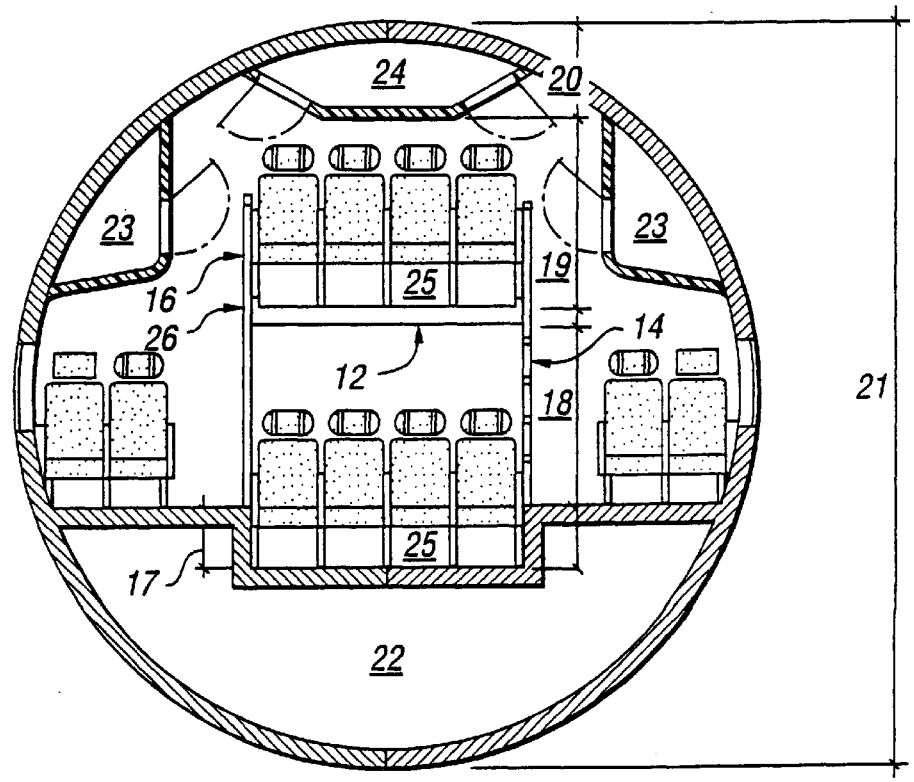
FIG. 10 is a cross-sectional view of an Airbus A330 with the proposed ComfortAir Class seating configuration of the first seating plan.

FIGS. 9 and 10 show the seating configuration of the first seating plan in an Airbus A330. FIG. 9 is an 11'0" upper level 12 partial floor plan for the proposed ComfortAir Class seating configuration using the increased 3'8" pitch 13. The combined lower and upper level 12 seating capacity in the midsection is 36 seats, each row consisting of eight chairs 1 on two levels plus four chairs 1 in the two side sections. These three rows of twelve seats each replace the current four rows of eight seats each, resulting in a total of thirty-six seats instead of the existing thirty-two seats. The alternating stepladder-like devices 14 and the side railings 16 are shown. The aisle 27 width is 1'7", the midsection 28 width is 6'0", and the side section 29 width is 3'7" each.

FIG. 10 shows the details of the first seating plan in a cross section through an Airbus A330 with an inside diameter 21 of 17'2". With the 1'5" dip 17 into the cargo hold 22, enough headroom 18, 19 is available for both levels. The lower level headroom 18 is 5'9", and the upper level 12 headroom 19 is 5'0". The overhead luggage enclosure 24 has a height 20 of 1'6". A 4" curb 26 keeps passenger gear from falling into the aisle below. The alternating stepladder-like devices 14 and the side railings 16 frame the midsection seats. The increased size of the side luggage enclosures 23 combined with the additional hand luggage enclosure 24 above the upper level 12 seats and with the presently existing under-the-seat luggage storage 25 provide sufficient space to satisfy this need.

Figure 11:
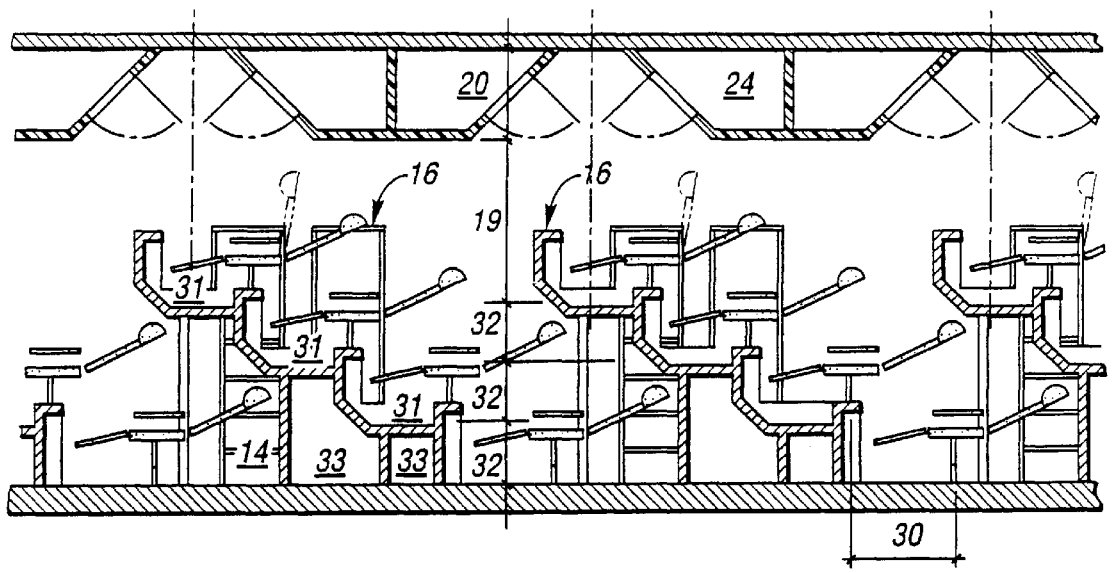
FIG. 11 is a longitudinal section view through a Boeing 747 showing the proposed four level staggered seating configuration of a second seating plan with improved passenger chairs, stepladder-like devices, and luggage enclosures.
Figure 12:
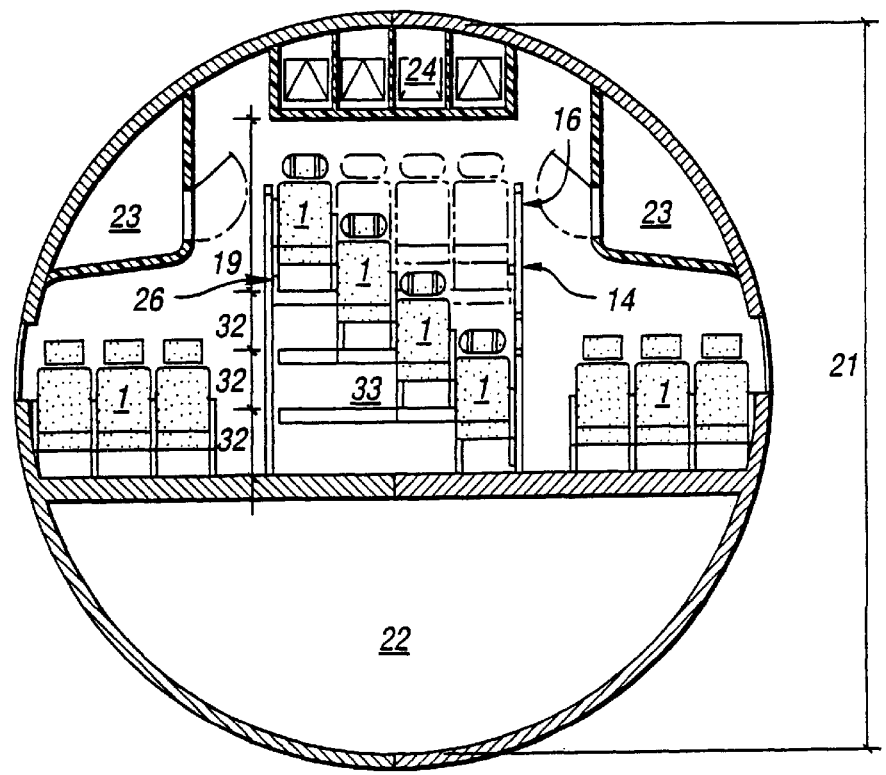
FIG. 12 is a cross-sectional view through a Boeing 747 showing the proposed ComfortAir Class seating configuration of the second seating plan with the enlarged side luggage enclosures, the added hand luggage enclosure above the upper level and the four levels of seating.
Figure 13:
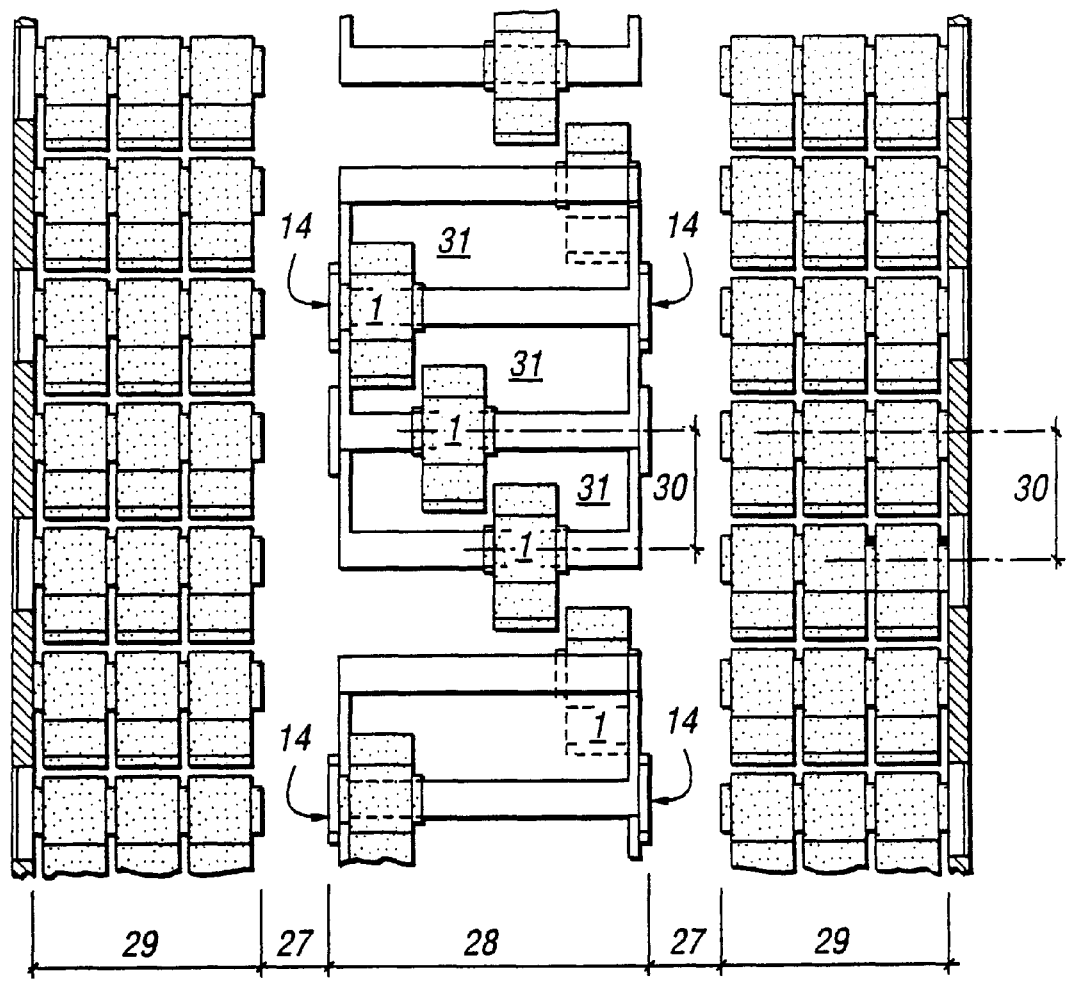
FIG. 13 is a partial floor plan of a Boeing 747 with an existing Economy class pitch and seating configurations in side sections, and a staggered four level ComfortAir Class seating configuration of the second seating plan in the middle section.

A second seating plan is shown in FIGS. 11 through 13. The ComfortAir Class chair 1 is used but the existing Economy class 2'9" pitch 30 is being maintained. The floor heights of consecutive rows of chairs 1 are staggered, allowing the seat backs 3 to overlap the legrests 4. This improved seating configuration applies only to the midsection of the aircraft, the side sections remain the same.

FIG. 11 is a longitudinal section through the different aircraft listed above. FIG. 11 shows staggered floors 31 in a second seating plan configuration, each floor being 1'8" higher 32 than the one behind it. The 2'9" pitch 30 has been maintained. Stepladder-like devices 14 gain access to the two upper floors 31. Railings 16 have been added for passenger safety and sense of comfort. Using the Boeing 747 as an example, the upper headroom 19 is 4'8", the luggage enclosure 24 has a height 20 of 2'8" and it is accessed from the highest level floor 31 only. Additional luggage enclosures 33 have been added under the second and third levels of rows.

FIG. 12 shows the details of the second seating plan in a cross-sectional view through a Boeing 747 with an inside diameter 21 of 20'0". The midsection shows the staggered levels of floors 31 with four adjacent chairs 1 per level. only a single chair 1 per row is illustrated, for clarity sake. A 4" curb 26 keeps passenger gear from falling into the aisle below. The stepladder-like devices 14 and the side railings 16 frame the midsection seats. The increased size of the side luggage enclosures 23 combined with the additional hand luggage enclosure 24 above, and the new luggage enclosures 33 under the seats in rows two and three, provide sufficient space to satisfy the need for storage. The headroom 19 from the floor of the highest row of seats to the bottom of the upper luggage enclosure 24 is 4'8", and the vertical rise 32 between seating levels is 1'8". The overhead luggage enclosure 24 has a height 20 of 2'0".

FIG. 13 shows a partial floor plan of a Boeing 747 with the existing aisle 27 width of 1'7", a midsection 28 width of 6'10", and the side section 29 width of 5'0" each. The 2'9" pitch 30 remains the same as in Economy class now, but the floors 31 in the midsection are staggered. Only a single chair 1 per row is illustrated, for clarity sake. Stepladder-like devices 14 from each aisle are used to access the two upper levels.

Figure 14:
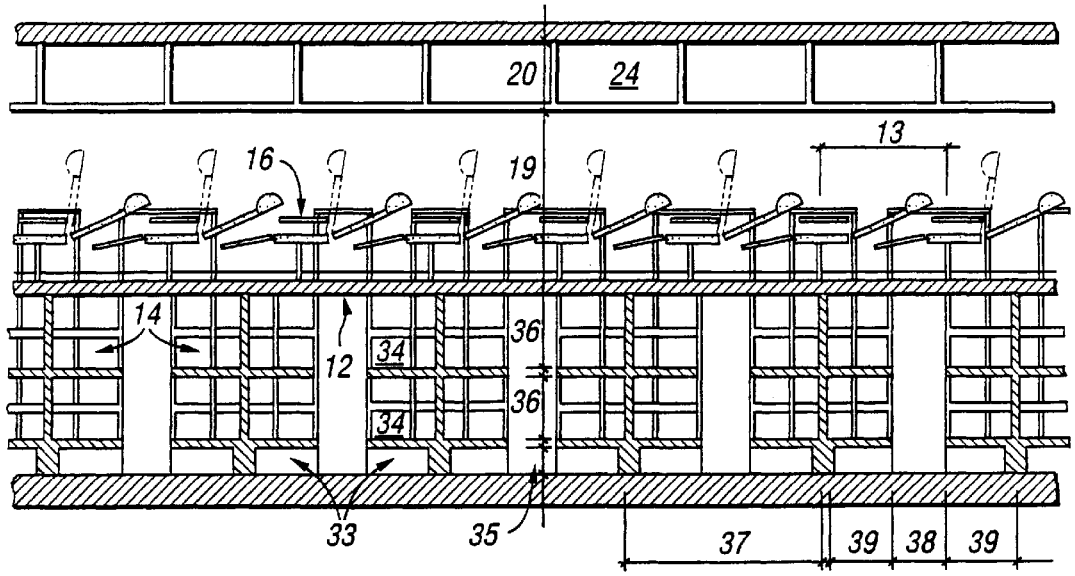
FIG. 14 is a longitudinal section view of a Boeing 747 with ComfortAir Class two level sleeping compartments below, and with an upper level seating section above, as in a third seating plan.
Figure 15:
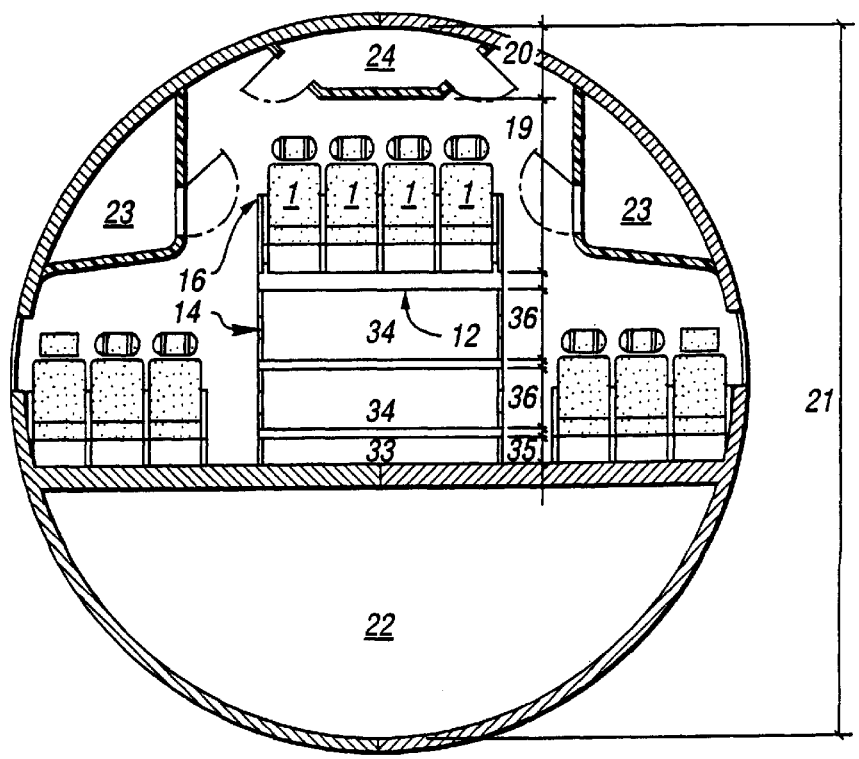
FIG. 15 is a cross-sectional view of a Boeing 747 showing a seating configuration of the third seating plan.
Figure 16:
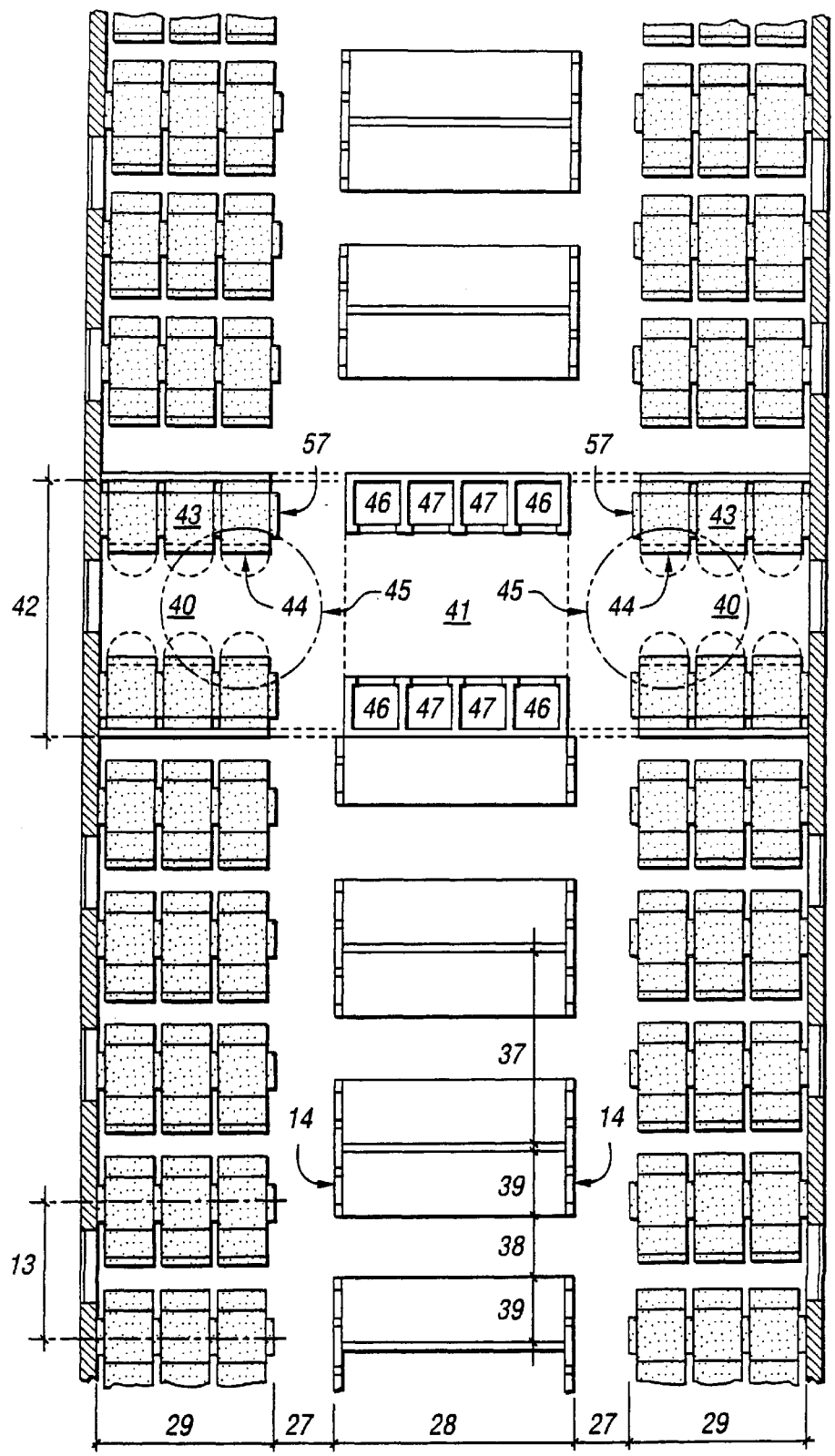
FIG. 16 is a partial floor plan of a Boeing 747 showing proposed ComfortAir Class seating configuration including two Dining Parlors and a meal dispensing restaurant of the third seating plan.

The third seating plan is shown in FIGS. 14 through 16. It consists of sleeping compartments 34 in the lower part of the midsection, with an upper level 12 seating configuration identical with that in the first seating plan.

FIG. 14 is a third seating plan longitudinal section through the different aircraft listed above. Two tier sleeping compartments 34 occupy the space below an upper level 12 seating configuration using the ComfortAir chair 1 with the 3'8" pitch 13. Four sleeping compartments 34 form a unit 37 which, using a Boeing 747 as an example, occupies 5'6" of the aircraft's length and which also occupies the entire midsection 28 width of 6'10". Two units 37 occupy the same 11'0" floor space occupied by three rows of chairs 1 at the 3'8" pitch 13. A sleeping compartment 34 is 2'0" deep 39 and 2'2" high 36 including the upholstery padding and each unit 37 has a center 38 aisle which is 1'6" wide. Stepladder-like devices 14 used to access the upper level 12 chairs 1 are doubling as open ended boundaries at the head and foot of each sleeping compartment 34. The upper level 12 headroom 19 to the overhead luggage enclosure 24 is 5'3", and the enclosure 24 itself has a height 20 of 2'0". Additional luggage enclosures 33 which are 8" 35 high are positioned beneath the bottom sleeping compartment 34.

Passengers in the lower section have enough space to completely stretch out during the entire time of long flights, without disturbing anyone else. They will not, however, also have the option of sitting up, and will be able to dine only in the dining parlors. This is why their requests for seats in a "Dining—Just Below the Angels" parlor will have automatic priority over similar requests from other passengers.

A pillow and side reading lights provide the necessary conditions for relaxation when sleep is not desired, and an individualized TV-like monitor will make for comfortable television and movie viewing. Each shelf compartment occupies the entire width of the midsection of wide-body aircraft.

FIG. 15 shows these details of the third seating plan in a cross-sectional view through a Boeing 747 with an inside diameter 21 of 20'0". The midsection has two stacked sleeping compartments 34 below an upper level 12 seating configuration using the ComfortAir chair 1. Stepladder-like devices 14 and side railings 16 define the midsection seats.

The enlarged side luggage enclosures 23 together with the overhead luggage enclosure 24 and the new luggage enclosures 33 below the bottom sleeping compartment 34 provide sufficient space to satisfy this need for storage. The luggage enclosure 33 beneath the bottom sleeping compartment 34 is 8" high 35, each compartment 34 is 2'2" high 36, the upper level 12 headroom 19 is 5'3" and the overhead luggage enclosure 24 has a height 20 of 2'0".

FIG. 16 is a partial floor plan of a Boeing 747 with the proposed third seating plan configuration. The existing aisle 27 width is 1'7", the midsection 28 width is 6'10" and the side section 29 width is 5'0" each. The 3'8" pitch 13 is used for seating throughout, both in the side sections and in the upper level 12 seating configuration. The unit 37 width is 5'6" with each sleeping compartment 34 being 2'0" deep 39 and the unit center 38 aisle being 1'6" wide. Stepladder-like devices 14 on both sides are used to gain access to the upper level 12 seats.

For this third seating plan, as seen in an 11'0" segment of the partial floor plan, the number of saleable seats will thus be reduced from forty to thirty-eight, consisting of eight sleeping compartments 34 in two units 37 below three rows with ten chairs 1 in each on the upper level 12. The markedly improved travel conditions will probably create a high tolerance for modifying the price structure somewhat to make up for this loss of two seats.

The safety of passengers is also sharply increased by any one of these three new seating configurations. This may at times become of major, or even of vital, importance. Evacuation time from the aircraft is markedly reduced when more space between rows becomes available. The current, extremely tight packing of passengers into the aircraft poses a constant risk when medical or other emergencies suddenly arise.

"Dining—Just Below the Angels" parlors and the meal dispensing self-service restaurants are illustrated in FIGS. 16 through 20.

FIG. 16 is a partial floor plan of a Boeing 747 showing two "Dining—Just Below the Angels" parlors 40 and one meal dispensing self-service restaurant 41. The length 42 of a dining parlor 40 is 7'4", and each parlor 40 has six non-reclining seats 43 with a moveable tabletop 44 which is positioned above the seat 43 when not in use. The table top 44 is therefore upholstered on the bottom side to match the seat, and it is swung down by means of hinged arms 57 at both sides of each seat, following the principle used in a child's high chair. A domed ceiling 45 crowns each dining parlor. Meal dispensing self-service restaurants 41 have four serving cubicles on each side, two with glass doors 46 used for dispensing pre-packaged heated or cold meals, and two without doors 47 where a variety of hot and cold drinks are obtainable.

Figure 17:
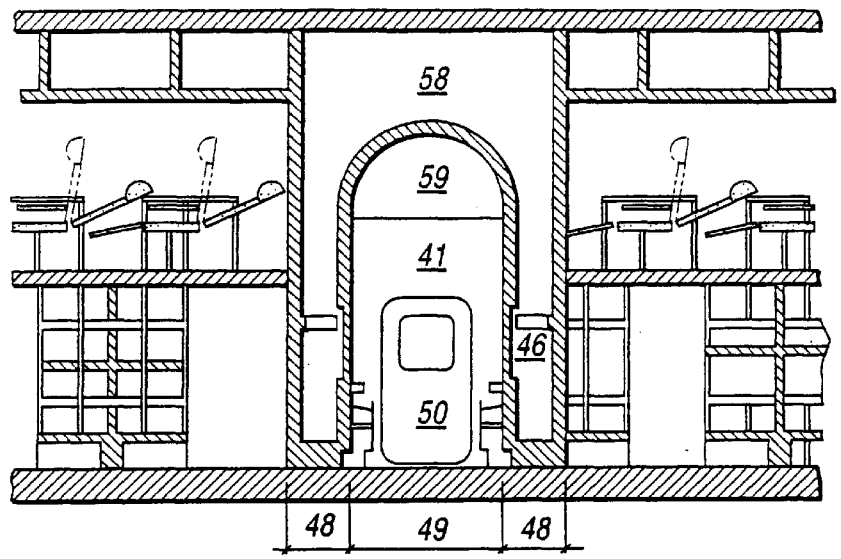
FIG. 17 is a longitudinal section view through a meal dispensing restaurant showing the seating configuration of the third seating plan.

FIG. 17 is a longitudinal section view in a Boeing 747 of a meal dispensing self-service restaurant 41 with a vaulted ceiling 59 and meal storage and queuing space 58 over and along the sides of the vaulted ceiling 59. A "Dining—Just Below the Angels" parlor 40 shows beyond, and as always it is located at an emergency door exit 50. An aircraft length of 4'4" 49 separates opposite side serving cubicles, and the cubicles themselves have a depth of 1'6" 48 each, including the wall thickness. A conventional conveyer belt system brings the meals a from conventional refrigerated storage above through a conventional heating chamber to the front of the access glass doors 46.

Figure 18:
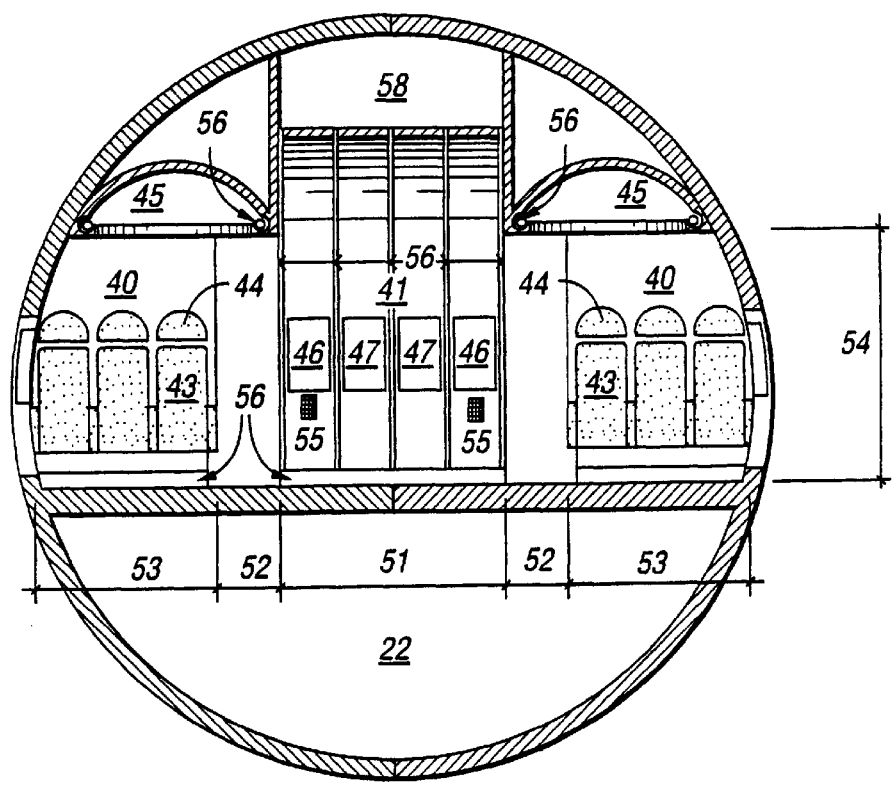
FIG. 18 is a cross-sectional view through a meal dispensing restaurant and through two "Dining —Just Below the Angels" parlors.

FIG. 18 is a cross-sectional view in a Boeing 747 of one meal dispensing self-service restaurant 41 and two dining parlors 40. The aisle has been widened to 2'0" 52, the restaurant 41 width is 6'0" 51 and the dining parlor 40 width is 5'0" 53. The ceiling of the dining parlor 40 is 7'0" 54 high, not including the dome 45. Hidden, peripheral lights 56 circle the base of the dome 45, and hidden strips of lights 56 are also placed in the toe space under the dining parlor seats 43 and in the restaurant 41, as well as in the vertical "reveals" of the vaulted restaurant 41 enclosure. A conventional push button control panel 11 for accessing the meals is found beneath each glass door 46. The cargo hold 22 area is not dipped here.

Figure 19:
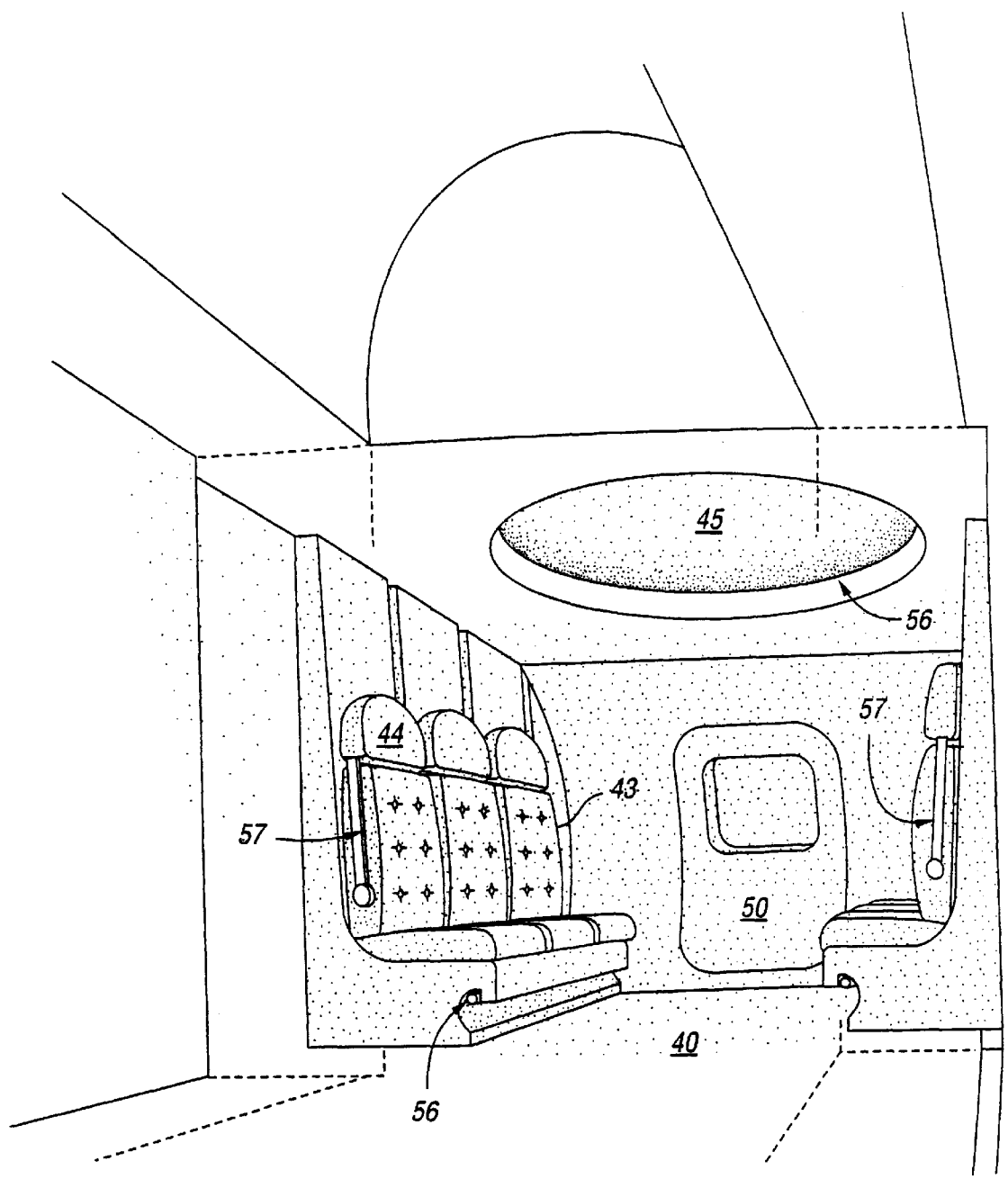
FIG. 19 is a perspective view of a "Dining—Just Below the Angels" parlor.

FIG. 19 is a view of a "Dining—Just Below the Angles" parlor 40 with tabletops 44 shown in the upright position with hinged arms 57. Hidden circular strip lighting 56 inside the rim of the "Skyline" dome 45 and in the toe space of the seats 43 make for a soft and inviting setting. These dining parlors 40 are always located at the emergency door exits 50.

Figure 20:
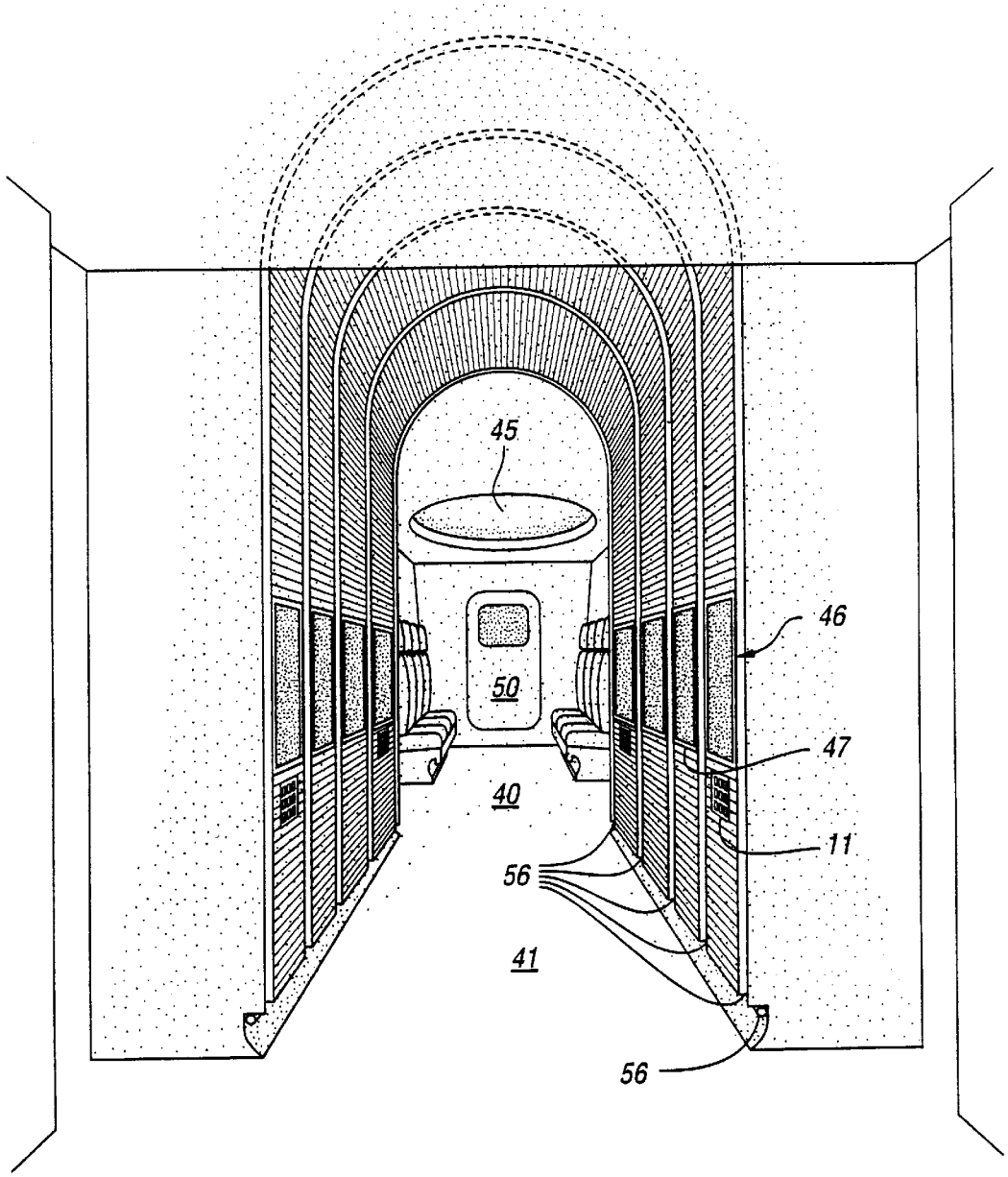
FIG. 20 is a perspective view of a meal dispensing restaurant in front of a "Dining—Just Below the Angels" parlor.

FIG. 20 is a view through a meal dispensing self-service restaurant 41 and a "Dining—Just Below the Angles" parlor 40 with its "Skyline" dome 45 beyond. The meal serving glass access doors 46 and the open beverage serving cubicles 47 are found on each side, with a conventional push button control panel 11 beneath each glass door 46. Hidden vertical strip lighting 56 and hidden toe space strip lighting brighten the vaulted enclosure.

Each seat or sleeping compartment is equipped with an electronic communication system consisting of a monitor including a twelve push button control panel as shown in FIG. 1. Various code-number combinations will enable passengers to "line-up" electronically, rather than physically, for a respective dining service or restroom facility.

One combination will indicate a request to use the next available free restroom, another will bring the day's menu or the duty-free catalogue into view. Other combinations will reserve the next available seat in a "Dining—Just Below the Angels" parlor, or summon a flight attendant. Enough reserve capacity will already have been built into the system to allow for additional uses in the future, such as the one mentioned next.

By entering a given number combination, and with the aid of a video camera in the cockpit, it will now be possible to allow every passenger to selectively view take-offs, landings and/or interesting features of the landscape below. This virtual "visiting with the pilot" program fulfills one more high-priority wish of the flying public, as determined by opinion surveys. Having the ability to actually see where the aircraft is, and where it is going, is likely to lessen the common fear of flying that many travellers and potential travellers have, thus providing a less stressful environment and a competitive edge to airlines using this system.

The menu presentation will consist of both a pictorial display and a listing of the available choices. As in any good restaurant, it will be possible to ask for and obtain via one's ear phones a verbal presentation and explanation describing any item on the menu by "dialing" for it. Available beverage selections will also be attractively displayed on ever monitor, and both hot and non-alcoholic cold drinks will be available freely at all times. Alcoholic drinks will be ordered by computer and retrieved with or without payment from a crew member at the "Bar".

Menu selections are made by entering a specified number combination for each desired menu item. Passengers will be immediately notified when a menu selection has become unavailable, and they will be urged then to register a second choice by entering a different number combination. As soon as all the desired selections have been made, the monitor will instantly flash the exact time when the selected meal will be ready. A code number will then also be assigned and immediately displayed on the passenger's monitor, and so will be the location of the restaurant where it will be "served". When this code number is entered at the correct time and in the assigned restaurant, it will release the glass door, as shown in FIG. 20, behind which the ordered meal will be waiting at the desired temperature, ready to be picked up.

In all cases, the control function will always be exercised by a service computer. The chief flight attendant will be able to override this automatic control function in case of emergencies, for instance if a sick passenger suddenly is in need of a restroom. But under normal circumstances, when a request for a service is made, the location of a vacant facility and the anticipated time when it becomes available will be simultaneously and instantaneously displayed on the monitor, with the facility assigned always being the nearest one to the passenger's seat. Flight information and a continuous view of the route chart together with the slowly moving position of the aircraft will also be available at all times upon request on the passenger's monitor.

In aircraft using this communication system it will no longer be necessary to ever stand in line physically. This will always be done electronically. The crowding and waiting next to occupied restroom cubicles, a recurring nuisance for passengers nearby, will be a thing of the past. Up to now this has always been an unavoidable source of repeated complaints and annoyance. Passengers will also no longer interfere with the crew working in the galley.

Finally, the monitor will also display the available movies to be chosen and viewed at any time during the flight, not necessarily with anyone else. The same with television programs. The overhead projection and the darkening of the cabin will no longer be needed once movies are individually ordered and shown at the seat.

It is to be understood, of course, that while the forms of the invention described above constitute the best mode contemplated of practicing the present invention, the preceding description is not intended to illustrate all possible forms thereof. It is also to be understood that the words used are words of description, rather than of limitation, and that various changes may be made without departing from the spirit and scope of the present invention, which should be construed according to the following claims.

What is claimed is:

1. A seating plan for an aircraft comprising:
    said aircraft having a generally cylindrical interior volume having a forward nose portion and rearward tail portion defined by a frame, the volume being longitudinally separated by a floor into a lower cargo hold and an upper passenger cabin;
    two side seating areas adjacent to side wall of said frame each one of said side seating areas having a first multiplicity of chair rows wherein the first multiplicity is configured to extend lengthwise through said passenger cabin and the first multiplicity is affixed to said floor;
    a midsection seating area having a second multiplicity of chair rows wherein the second multiplicity is configured to extend lengthwise through said passenger cabin, the second multiplicity of chair rows being vertically displaced relative to the first multiplicity of said side seating area and each of the second multiplicity comprises at least three adjacent chairs; and
    two parallel aisles extending lengthwise independent of stepped gradation therealong through said passenger cabin, each of said two parallel aisles allowing simultaneous access to the first multiplicity of chair rows of one of said two side seating areas and the second multiplicity of chair rows of said midsection seating area at least one ladder in one of said two parallel aisles and extending vertically from said floor to the second multiplicity.

2. The seating plan of claim 1 wherein the second multiplicity is vertically displaced upward relative to the first multiplicity and the first and the second multiplicities are forward facing.

3. The seating plan of claim 2 further comprising at least one compartment vertically beneath the second multiplicity, the compartment adapted for article storage or as a sleeping berth.

4. The seating plan of claim 1 wherein said midsection seating area further comprises a third multiplicity of chair rows configured to extend lengthwise through said passenger cabin and the third multiplicity is vertically displaced relative to the second multiplicity.

5. The seating plan of claim 4 wherein the second multiplicity of chair rows is vertically displaced upward relative to the first multiplicity and the third multiplicity is vertically displaced below the second multiplicity and the first multiplicity of chair rows and the f second and third multiplicities are forward facing.

6. The seating plan of claim 4 wherein the second multiplicity is vertically displaced upward relative to the first multiplicity and the third multiplicity is vertically level with the first multiplicity.

7. The seating plan of claim 4 wherein said midsection seating area further comprises a fourth multiplicity of chair rows configured to extend lengthwise through said passenger cabin and the fourth multiplicity is vertically displaced relative to the second and third multiplicities.

8. The seating plan of claim 4 wherein said midsection seating area further comprises a fifth multiplicity of chair rows configured to extend lengthwise through said passenger cabin and the fifth multiplicity is vertically displaced relative to the second, third and fourth multiplicities.

9. The seating plan of claim 8 wherein said midsection seating area further comprises a sixth multiplicity of chair rows configured to extend lengthwise through said passenger cabin and the sixth multiplicity is vertically displaced relative to the second, third and fourth multiplicities.

10. The seating plan of claim 7 wherein a chair row of the second multiplicity of chair rows is followed by a chair row of the third multiplicity, a chair row of the fourth multiplicity, and a chair row of the fifth multiplicity to give a chair row sequence and the chair row sequence is repeated lengthwise through said passenger cabin.

11. The seating plan of claim 7 further comprising at least one ladder adjacent to one of said two parallel aisles and extending vertically from said floor to the third multiplicity.

12. The seating plan of claim 1 further comprising side luggage enclosures affixed to the frame of said aircraft vertically above said side seating area.

13. The seating plan of claim 1 further comprising side luggage enclosures affixed to the frame of said aircraft vertically above said midsection seating area.

14. The seating plan of claim 1 wherein each chair row of the second multiplicity comprises at least four chairs.

15. A seating plan for an aircraft comprising:
    said aircraft having a generally cylindrical interior volume having a forward nose portion and a rearward tail portion defined by a frame, the volume being longitudinally separated by a floor into a lower cargo hold and an upper passenger cabin;

two side seating area adjacent to side wall of said frame each one of said side seating areas having a first multiplicity of chair rows wherein the first multiplicity is configured to extend lengthwise through said passenger cabin and the first multiplicity is affixed to said floor;

a midsection seating area having a second multiplicity of chair rows wherein the second multiplicity is configured to extend lengthwise through said passenger cabin, the second multiplicity of chair rows being vertically displaced relative to the first multiplicity of said side seating area and each of the second multiplicity comprises at least three adjacent chairs, wherein the at least three chairs of each chair row of the second multiplicity have a pitch of greater than 33 inches; and two parallel aisles extending lengthwise independent of stepped gradation therealong through said passenger cabin, each of said two parallel aisles allowing simultaneous access to the first multiplicity of chair rows of one of said two side seating areas and the second multiplicity of chair rows of said midsection seating area at least one ladder in one of said two parallel aisles and extending vertically from said floor to the second multiplicity.

16. The seating plan of claim 15 wherein the second multiplicity of chair rows is vertically displaced upward relative to the first multiplicity of chair rows and the first and the second multiplicities are forward facing.

17. The seating plan of claim 16 further comprising at least one compartment vertically beneath the second multiplicity, the compartment adapted for article storage or as a sleeping berth.

18. The seating plan of claim 15 wherein the pitch is between 34 and 44 inches.

19. The seating plan of claim 15 wherein said midsection seating area further comprises a third multiplicity of chair rows configured to extend lengthwise through said passenger cabin, wherein chairs comprising each row of the third multiplicity have a pitch greater than 33 inches, and the third multiplicity is vertically displaced relative to the second multiplicity.

20. The seating plan of claim 19 wherein the second multiplicity is vertically displaced upward relative to the first multiplicity and the third multiplicity is vertically displaced below the second multiplicity and the first multiplicity and the first, second anti third multiplicities are forward facing.

21. The seating plan of claim 19 wherein the second multiplicity is vertically displaced upward relative to the first multiplicity and the third multiplicity is vertically level with the first multiplicity and the first, second and third multiplicities are forward facing.

22. The seating plan of claim 19 wherein said midsection seating area further comprises a fourth multiplicity configured to extend lengthwise through said passenger cabin, wherein chairs comprising each row of the fourth multiplicity have a pitch greater than 33 inches, and the fourth multiplicity is vertically displaced relative to the second and third multiplicities.

23. The seating plan of claim 22 wherein said midsection seating area further comprises a fifth multiplicity of chair rows configured to extend lengthwise through said passenger cabin and the fifth multiplicity is vertically displaced relative to the second, third and fourth multiplicities, wherein chairs comprising each row of the fifth multiplicity have a pitch greater than 33 inches.

24. The seating plan of claim 23 wherein said midsection seating area further comprises a sixth multiplicity of chair rows configured to extend lengthwise through said passenger cabin and the sixth multiplicity is vertically displaced relative to the second, third and fourth multiplicities, wherein chairs comprising each row of the sixth multiplicity have a pitch greater than 33 inches.

25. The seating plan of claim 23 wherein a chair row of the second multiplicity is followed by a chair row of the third multiplicity and by a chair row of the fourth multiplicity and a chair row of the fifth multiplicity to give a chair row sequence and the chair row sequence is repeated lengthwise through said passenger cabin.

26. The seating plan of claim 22 further comprising at least one ladder adjacent to one of said two parallel aisles and extending vertically from said floor to the third plurality of chair rows.

27. The seating plan of claim 15 further comprising side luggage enclosures affixed to the frame of said aircraft vertically above said side seating area.

28. The seating plan of claim 15 further comprising side luggage enclosures affixed to the frame of said aircraft vertically above said midsection seating area.

* * * * *

UNITED STATES PATENT AND TRADEMARK OFFICE
CERTIFICATE OF CORRECTION

PATENT NO. : 6,237,872 B1
DATED : May 29, 2001
INVENTOR(S) : Reuven Bar-Levav

It is certified that error appears in the above-identified patent and that said Letters Patent is hereby corrected as shown below:

<u>Title page,</u>
Item [56], References Cited, U.S. PATENT DOCUMENTS, please add the following:

| | | |
|---|---|---|
| 2,081,529 | 5/1937 | Canney |
| 2,092,655 | 9/1937 | Page, Jr. |
| 2,124,003 | 7/1938 | McDonell et al. |
| 2,208,683 | 7/1940 | Page, Jr. |
| 2,280,065 | 4/1942 | ~~Rode~~ Roode |
| 2,310,573 | 2/1943 | Burton |
| 2,332,841 | 10/1943 | Burton et al. |
| 2,382,402 | 8/1945 | ~~Rode~~ Roode |
| 2,419,498 | 4/1947 | Newton |
| 2,434,841 | 1/1948 | Dittrich |
| 2,595,607 | 5/1952 | Priebe |
| 3,784,989 | 1/1974 | LeGrand |
| 3,898,704 | 8/1975 | Gallaher et al. |
| 4,036,150 | 7/1977 | Algier |
| 4,066,227 | 1/1978 | Buchsel |
| 4,071,210 | 2/1978 | Mutke |
| 4,382,628 | 5/1983 | Palmgren |
| 4,589,612 | 5/1986 | Hailm |
| 4,666,204 | 5/1987 | Reinholtz |
| 4,686,908 | 8/1987 | LeGrand |
| 4,925,132 | 5/1990 | Zider |
| 5,024,398 | 6/199 | Riedinger et al. |
| 5,259,575 | 11/1993 | Cabrera |
| 5,333,818 | 8/1994 | Brandt et al. |
| 5,383,629 | 1/1995 | Morgan |
| 5,425,516 | 6/1995 | Daines |
| 5,490,703 | 6/1996 | Hewko |
| 5,529,265 | 6/1996 | Sakuri |

UNITED STATES PATENT AND TRADEMARK OFFICE
CERTIFICATE OF CORRECTION

PATENT NO. : 6,237,872 B1
DATED : May 29, 2001
INVENTOR(S) : Reuven Bar-Levav

It is certified that error appears in the above-identified patent and that said Letters Patent is hereby corrected as shown below:

Column 5,
Line 10, after "number" insert -- of --.

Column 6,
Line 13, replace "5'10'"" with -- 5'0" --.

Column 8,
Line 4, replace "only" with -- Only --.

Column 9,
Line 63, after "meals" delete "a".

Column 10,
Lines 12 and 19, replace "Angles" with -- Angels --.
Line 57, replace "ever" with -- every --.

Column 12,
Line 24, replace "f" with -- first, --.
Line 35, replace "claim 4" with -- claim 7 --.

Column 13,
Line 1, replace "area" with -- areas --.
Line 14, before "at" delete "the".

Column 14,
Line 1, replace "anti" with -- and --.

Signed and Sealed this

Twentieth Day of May, 2003

JAMES E. ROGAN
*Director of the United States Patent and Trademark Office*